INVENTOR.
Gordon Lyle Fredendall
BY [signature]
ATTORNEY

July 22, 1958 G. L. FREDENDALL 2,844,645

COLOR TELEVISION RECEIVER, INTERMEDIATE FREQUENCY AMPLIFIER

Filed Aug. 15, 1952 3 Sheets-Sheet 2

INVENTOR.

Gordon Lyle Fredendall

BY Ohio [signature] Mitchell

ATTORNEY

July 22, 1958 G. L. FREDENDALL 2,844,645

COLOR TELEVISION RECEIVER, INTERMEDIATE FREQUENCY AMPLIFIER

Filed Aug. 15, 1952 3 Sheets-Sheet 3

INVENTOR.
GORDON L. FERDENDALL
BY Alvin L. Mitchell
ATTORNEY

United States Patent Office

2,844,645

Patented July 22, 1958

2,844,645

COLOR TELEVISION RECEIVER, INTERMEDIATE FREQUENCY AMPLIFIER

Gordon L. Fredendall, Huntingdon Valley, Pa., assignor to Radio Corporation of America, a corporation of Delaware Application August 15, 1952, Serial No. 304,553

2 Claims. (Cl. 178—5.4)

This invention relates to the reduction of distortion in color television; more particularly it relates to the reduction in cross talk in color television systems of the type wherein at least part of the color information is carried by sidebands of a color subcarrier that is phase modulated in accordance with hue and amplitude modulated in accordance with the degree of color saturation. In the color system referred to, the color carrier is generally located near the upper video frequency limit of the receiver and preferably falls at a 50% response point of a sloping portion of the overall video frequency response characteristic of the system so that one sideband of the subcarrier is substantially eliminated.

According to this invention the quality of the image is improved by reducing the slope of the overall frequency characteristic in the vicinity of the color carrier.

The manner in which this is done will be more apparent after a detailed consideration of the drawings in which.

Before proceeding with a discussion of the details of this invention the following brief description of the general type of color television system in which the invention is to be used is presented. Purely by way of example it will be assumed that the color carrier is derived at the transmitter in the following manner. During one field a wave having the same frequency as the color carrier and having a phase of zero degrees may be amplitude modulated in accordance with the amplitude variations of a color signal $C_1$ and a 90° phase of the same wave may be amplitude modulated with another color signal $C_2$. These two amplitude modulated waves are then added in linear fashion so as to produce a color carrier. At the receiver the color signal $C_1$ is recovered by a synchronous detector that heterodynes the received color carrier with a wave of color carrier frequency having a phase of zero degrees. Another synchronous detector recovers the signal $C_2$ by heterodyning the color carrier with a wave of color carrier frequency having a phase of 90°.

Figure 1:
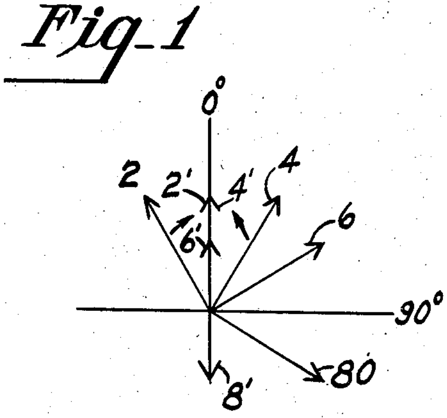
Figure 1 is a vector diagram used in explaining the manner in which sidebands of unequal strength produce an undesired spurious quadrature component.

This process may be better understood after an examination of the vector diagram of Figure 1 wherein the oppositely rotating vectors 2 and 4 represent the sidebands produced in the modulation of a zero degree wave of carrier frequency with a single frequency component of the color signal $C_1$ and the oppositely rotating vectors 6 and 8 represent the sidebands produced by the modulation of a 90° wave of carrier frequency with a single frequency component of the color signal $C_2$. The vectors 2 and 4 are symmetrically disposed at all times with respect to a 0° position and the vectors 6 and 8 are symmetrically disposed at all times with respect to the 90° position. The sidebands represented by the vectors 2, 4, 6, and 8 are all components of the color carrier that is applied to each of the synchronous detectors at the receiver. The zero degree synchronous detector that heterodynes the color carrier with a wave of color carrier frequency and zero degree phase produces a voltage wave proportional to the sum of the projections of all the vectors 2, 4, 6 and 8 on the 0° axis, these projections being indicated by the vectors bearing primed numerals. It will be seen that the projection vectors 6′ and 8′ are of equal length and opposite in direction so that they effectively cancel one another and that the output of the zero degree synchronous detector is equal to the sum of the projected vectors 2′ and 4′ alone. Since these vectors vary in amplitude only in accordance with the selected single frequency of $C_1$ and are not in any way affected by the components of $C_2$, there is no cross talk between the signals $C_1$ and $C_2$ as recovered by the receiver. A similar analysis will show that the signal $C_2$ alone is recovered by the 90° synchronous detector.

In the example just given, the sidebands 2 and 4 were equal in amplitude and the sidebands 6 and 8 were equal in amplitude so that the quadrature components of each pair, indicated by primed numerals, effectively cancelled one another. However, if in the above example, the sideband 8 had a greater amplitude than the sideband 6, the projection components 6′ and 8′ would not have equal amplitudes and would not cancel with the result that the amplitude of the zero phase components derived by the zero phase detector would be an error. Under these conditions the color signal $C_2$ would be mixed in some degree with the color signal $C_1$ that is derived by the zero degree detector. There would be a similar mixture of the color signal $C_1$ into the color signal $C_2$ that is derived by the 90° phase detector. This crosstalk of $C_1$ into $C_2$ and $C_2$ into $C_1$ reduces the quality of the image reproduced from these signals and is termed quadrature component distortion.

Figure 2:
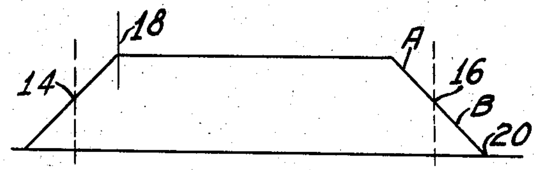
Figure 2 illustrates the overall frequency characteristics of the color television system in accordance with this invention.
Figure 3:
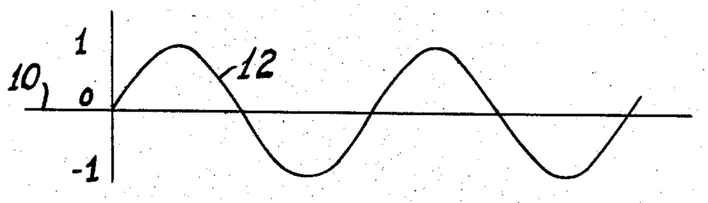
Figure 3 illustrates a color carrier signal representative of a transition from gray to a color field.

A better appreciation of the amount of cross talk introduced by phase quadrature components may be had from an examination of the effect of a system having an overall frequency response as indicated in Figure 2 on a signal such as represented by the wave of Figure 3. In a color television system of this type the color carrier has zero amplitude for portions of the image that are white, gray, or black as these are not colors but equal amounts of all colors and therefore represent a lack of any particular color. Accordingly the section 10 of the curve of Figure 3 represents gray as it has zero amplitude. The section 12, on the other hand, corresponds to some hue wherein at least one of the selected component colors has a greater intensity than the rest. In this particular system, the main carrier is located at a position 14 on the frequency characteristics of Figure 2 and the color carrier is located at a point 16. The points 14 and 16 are located half way up the slopes of the frequency response characteristic. Such an arrangement simulates a rectangular frequency characteristic for reasons well known to those skilled in the art. However, for the sake of convenience, let us consider what happens to the sideband components 2 and 4 of Figure 1 when they are passed through a system having a frequency characteristic illustrated by Figure 2. Let us assume that the frequency of the sidebands 2 and 4 is such that they could be located at points A and B respectively where the sideband 2 has twice the amplitude of the sideband 4. To represent this situation the vector 2 of Figure 1 should be double the length of the vector 4. The sum of the lengths of the vectors 2 and 4 should be the same in either case. Originally the projections 2′ and 4′ along the zero degree axis were equal, but under conditions of unequal vector length the vector projection 2′ will be twice the length of vector projection 4′. However, in either case the sum of the projections is equal and their contribution to the signal $C_1$ that is recovered by the zero degree detector is the same as before. The projections of these unequal vectors 2 and 4 along the 90° axis are also unequal so that the phase quadrature components do not cancel out and they introduce cross talk into the $C_2$ signal derived by the 90° phase detector. The amount of the phase quadrature distortion therefore increases with the slope of the frequency response characteristic at the point of the color carrier.

Figure 4:
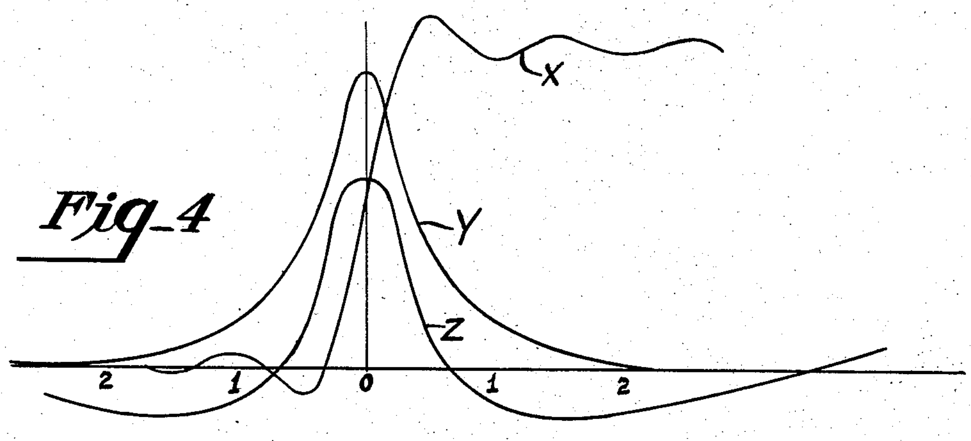
Figure 4 is comprised of curves illustrating the various components of the color signal of Figure 3.

Figure 4 illustrates in a quantitative manner the effect of a system having a frequency response characteristic such as shown in Figure 2 on a wave such as indicated by Figure 3. In the calculation on which these waves are based, it is assumed that the bandwidth of the color signals was such as to produce a lower sideband extending from point 16 to a point 18 and an upper sideband extending above the point 16 by an equal amount. However the upper sideband is altered as only frequencies out to a point 20 pass through the system with any substantial amplitude. The inphase component that corresponds to the color signal impressed on the modulator at the transmitter is represented in Figure 4 by a curve X and the phase quadrature component that introduces the cross talk is represented by a curve Y.

Figure 5:
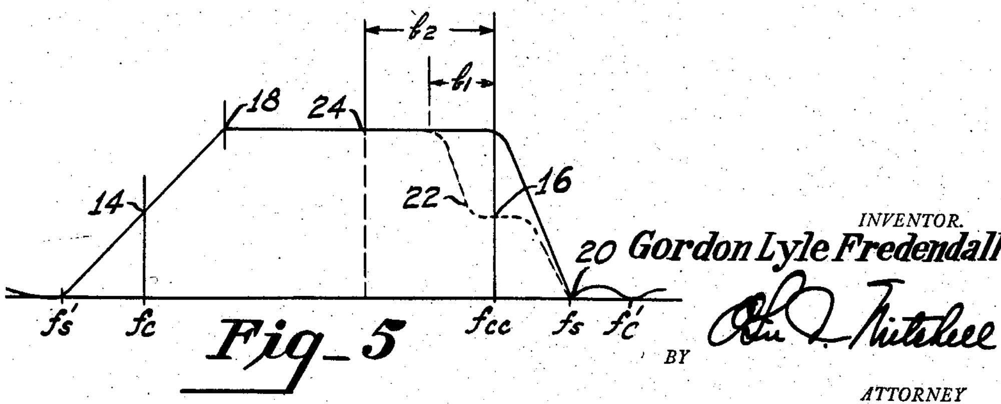
Figure 5 illustrates the overall frequency response of the system.

If, in accordance with this invention, the overall frequency response characteristic of the intermediate frequency amplifier is altered as indicated by the dotted line 22 of Figure 5 so that it is substantially flat in the vicinity of the color carrier *fcc*, the amount of quadrature component is considerably reduced as indicated by the curve Z of Figure 4. This is because the sidebands of the color carrier that lie in the flat region of the characteristic in the vicinity of the carrier have equal amplitudes. The quadrature component is not entirely eliminated because in this particular example the sidebands are permitted to extend beyond this flat portion of the characteristic by a substantial amount. In a practical case, the lowest frequency of the lower sideband might extend only to a point 24 so that the amplitude of the quadrature component would be much less than that indicated by the curve Z. It can be shown that the peak amplitude of curve Z is proportional to $$\log e\frac{f_2}{f_1}$$

$f_2$ and $f_1$ being indicated on Figure 5.

It should be noted that the amplitude of the in-phase or desired component of the signal is not altered in amplitude because the flat portion of dotted portion 22 of the desired characteristic is located at 50% response point so that the sum of the upper and lower sidebands falling in the flat portion is 100%. Sidebands falling outside of this flat region also add up to 100%.

There are many ways of altering the overall frequency response characteristic so that it is flat in the vicinity of the color carrier in accordance with the principles of this invention. In order to maintain the desired signal to noise ratio in the frequency region of the color subcarrier it is preferable to employ a transmitter having a flat characteristic over substantially the entire video spectrum and to obtain the desired overall characteristic by using appropriate circuits in the receiver.

Figure 6:
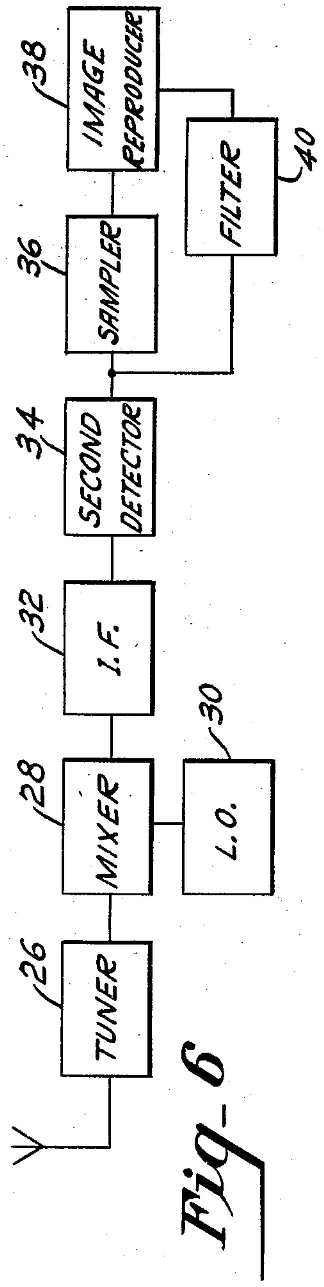
Figure 6 is a block diagram of one form of receiver that may be used in the type of color television system under discussion.

Figure 6 is a block diagram of the type of receiver that may be used in a color television system wherein the present invention may be applied and includes among other things a tuner 26, a mixer 28, a local oscillator 30, an I. F. strip 32, a second detector 34, a sampler 36, an image reproducer 38, and a filter 40 that selects the frequencies lying below the color carrier and applies them to the image reproducer. In some previous arrangements the color carrier frequency was less than that presently used so that it was located on a flat portion of the receiver frequency response characteristic. Consequently the quadrature component distortion was not noticeable. However, for various reasons it became evident that better results could be obtained by increasing the frequency of the subcarrier. Had the difficulties introduced by the presence of a quadrature component been realized, the flat portion of the receiver frequency response characteristic could have been extended so as to include the carrier, but this would have necessitated the use of expensive sharp cutoff filter so as to prevent interference between the sound and video channels. However, the difficulties introduced by the phase quadrature components was not realized and the color carrier was placed on a steeply sloping portion of the receiver frequency response characteristic so that a large amount of quadrature component distortion was introduced. Hence for the first time, the quadrature component distortion became noticeable although its cause was not recognized. As previously pointed out, this quadrature component is reduced in accordance with this invention by reducing the slope of the receiver frequency response characteristics. The frequency response of the tuner 26, and the mixer 28 could be altered so as to produce the desired frequency characteristic or additional filter might be employed, but a simple way of obtaining the desired characteristic is to place an absorption trap at an appropriate point in the I. F. strip 32. The location of the trap might vary and indeed more than one trap might be used depending on the particular design of the I. F. strip used.

Figure 7:
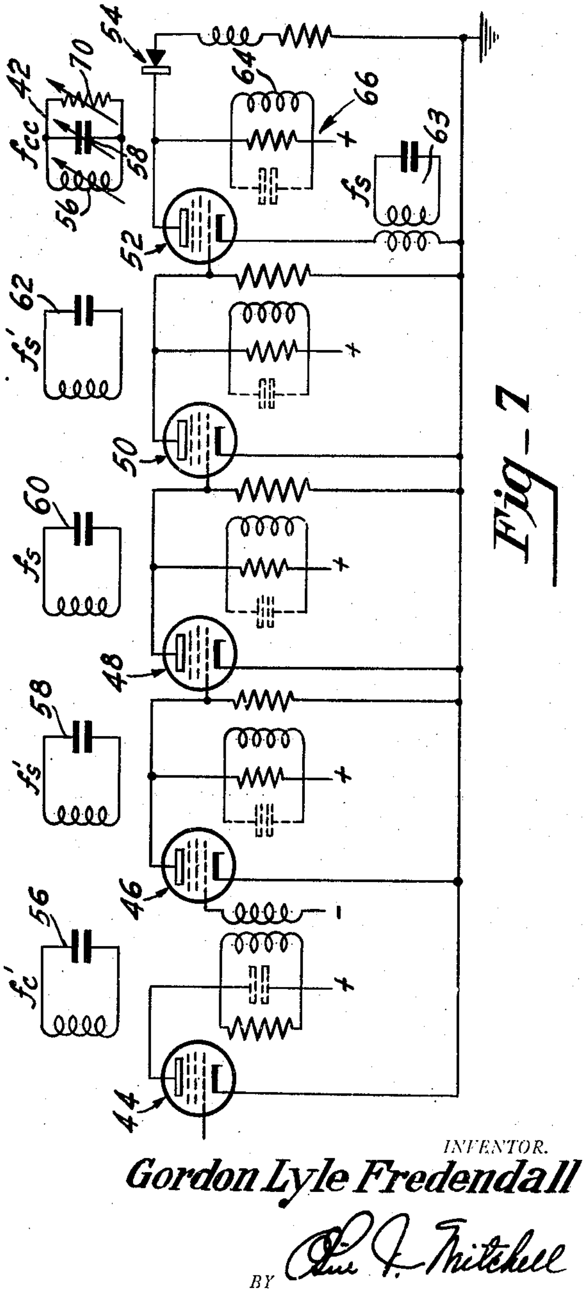
Figure 7 is a schematic representation of an I. F. strip that may be used in the receiver of Figure 6 so as to make the overall frequency response of the system the same for substantial portions of the sidebands of the color carrier.
Figure 8:
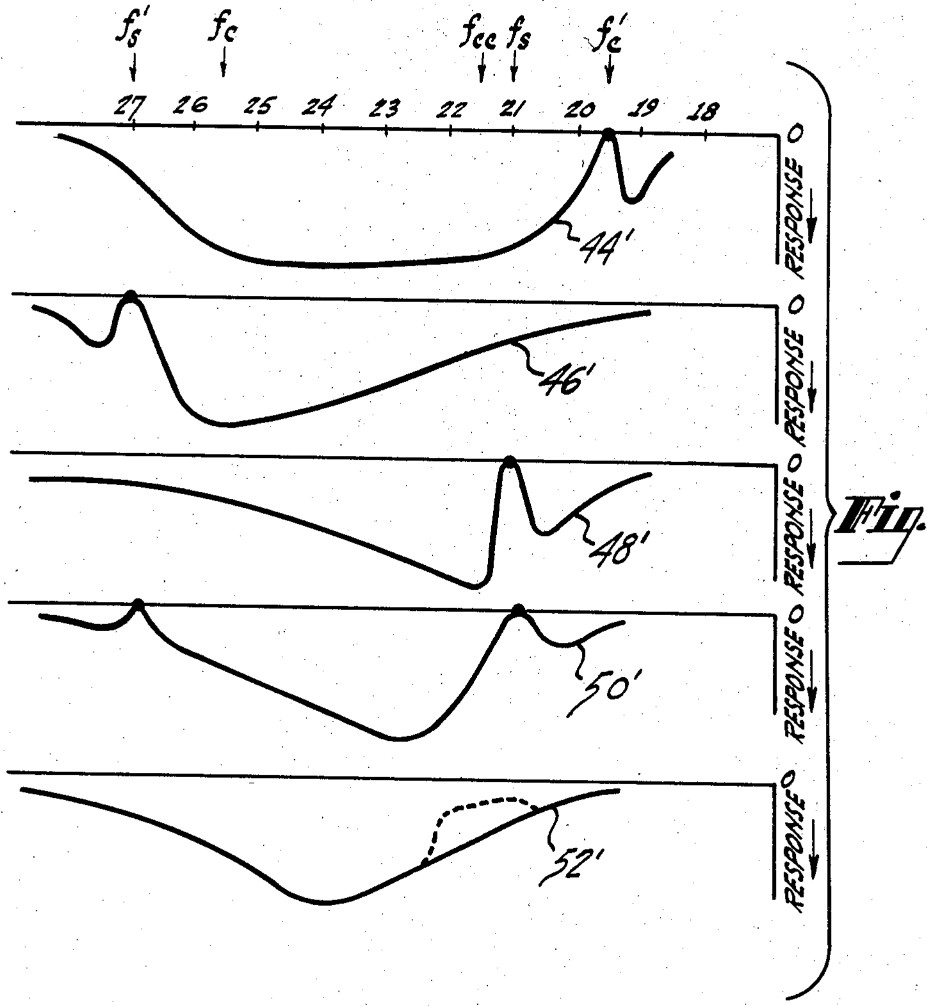
Figure 8 illustrates the frequency response characteristics of the various stages of amplification in the I. F. strip of Figure 7.

Figure 7 is a schematic diagram of a known type of I. F. strip to which has been added a trap 42 that operates to make the overall frequency characteristic of the system flat in the vicinity of the color carrier as required by the principles of this invention. This particular I. F. strip includes I. F. amplifying stages 44, 46, 48, 50 and 52 and a detector 54 coupled as shown, the frequency responses of each stage being illustrated by curves of Figure 8, bearing corresponding numerals that are primed. The usual traps 56, 58, 60, 62, and 63 that are tuned to the frequencies $f_c'$, $f_s'$, $f_s$, $f_s'$ and $f_s$ indicated in the frequency response characteristic of Figure 5 are also provided. In this particular I. F. strip the absorption circuit 42 is comprised of an inductance 56, a condenser 58 and a resistor 60 connected in parallel and mounted so that the inductance 56 is magnetically coupled to the inductance 64 of the load circuit 66 of the amplifier. This load circuit is designed so as to cause the last I. F. stage to be broadly tuned to the video pass band as can be seen from the curve 52′ of Figure 8. The effect of the trap circuit 42 is to reduce the response of the stage and hence the overall response of the system in the vicinity of the color carrier at the I. F. frequency level. The width of the flat portion of the overall characteristic in the vicinity of the color carrier is largely determined by the $L/C$ ratio and the value of R in accordance with well known principles. The center of the flat portion is largely determined by the value of $1\sqrt{LC}$.

In the receiver of Figure 6, the separate color signals are recovered by sampling the output of the second detector. In other words the sampling takes place at the video level. It has been suggested in U. S. Patent application bearing Serial No. 244,225 filed on August 29, 1951 in the name of George C. Sziklai, now Patent No. 2,750,440 issued on June 12, 1956, that the sampling process could be carried on at the I. F. level, thus eliminating the need for a second detector in the color channel. This invention may be used in such a receiver to reduce or eliminate quadrature component distortion. In a receiver of the type illustrated, wherein the sampling is done at the video level it is necessary that the frequency selective apparatus that reduces the slope of the frequency characteristics in the vicinity of the color carrier be located at a point in the receiver circuits that precedes the second detector. In a receiver of the type described in the Sziklai patent noted above, wherein no second detector is used in the color channel and wherein the sampling is performed at the I. F. level, it is necessary that the frequency selective means that reduces the slope of the frequency characteristics at the frequency assumed by the color carrier at the I. F. level be located before the sampler.

What is claimed is:

1. In a color television receiver adapted to receive a composite color television signal comprising a main picture carrier modulated by video signals representative of luminance information and additionally modulated by a modulated color subcarrier, chrominance information being conveyed by the sidebands of said modulated color subcarrier, and adapted to convert said received signal to occupy a predetermined band of intermediate frequencies, the frequency of the picture carrier of said converted signal being located near one edge of said band, the frequency of the color subcarrier of said converted signal being located near the opposite edge of said band such that the sideband of said subcarrier furthest removed from said picture carrier is more restricted in bandwidth than the other sideband of said color subcarrier, an intermediate frequency amplifier for amplifying said converted signal, said amplifier comprising means for providing said amplifier with a sloping frequency response characteristic for frequencies within a first portion of said band extending from said one edge, the picture carrier frequency of said converted signal falling intermediate the extremities of said first band portion, means for providing said amplifier with a substantially flat frequency response characteristic for frequencies within a second portion of said band adjacent said opposite edge, said second band portion being centered about the color subcarrier frequency of said converted signal, and means for providing said amplifier with a substantially flat frequency response characteristic for frequencies within a third portion of said band intermediate said first and second band portions, said third band portion encompassing a segment of said other sideband furthest removed from said color subcarrier, said second named means providing a level of response for said amplifier in said second band portion which is substantially lower than the level of response provided for said amplifier in said third band portion by said third named means.

2. In a color television receiver adapted to receive a composite color television signal comprising a main picture carrier modulated by video signals representative of luminance information and additionally modulated by a modulated color subcarrier, chrominance information being conveyed by the sidebands of said modulated color subcarrier, and adapted to convert said received signal to occupy a predetermined band of intermediate frequencies, the frequency of the picture carrier of said converted signal being located near one edge of said band, the frequency of the color subcarrier of said converted signal being located near the opposite edge of said band such that the sideband of said color subcarrier furthest removed from said picture carrier is more restricted in bandwidth than the other sideband of said color subcarrier, said receiver including an intermediate frequency amplifier for amplifying said converted signal, the combination comprising means included in said intermediate frequency amplifier for providing said amplifier with a varying level of response for frequencies within a first portion of said band extending from said one edge, the picture carrier frequency of said converted signal falling intermediate the extremities of said first band portion, the level of amplifier response for said first band portion varying from a minimum at the extremity corresponding to said one edge to a maximum at the opposite extremity, means included in said intermediate frequency amplifier for providing said amplifier with a substantially uniform response at a level intermediate said maximum and said minimum for frequencies within a second portion of said band adjacent said opposite edge, said second band portion being centered about the color subcarrier frequency of said converted signal, and means included in said intermediate frequency amplifier for providing said amplifier with a substantially uniform response at a level corresponding to said maximum for frequencies within a third portion of said band intermediate said first and second band portions, said third band portion encompassing a segment of said other sideband furthest removed from said color subcarrier.

References Cited in the file of this patent

UNITED STATES PATENTS

| | | |
|---|---|---|
| 2,552,464 | Siezen | May 8, 1951 |
| 2,558,489 | Kalfaian | June 26, 1951 |
| 2,635,740 | Dome | Apr. 14, 1953 |

OTHER REFERENCES

A Two Color Direct-view Receiver for the RCA Color Television System, published by RCA, November 1949, pp. 5 and 6.